United States Patent [19]

Tomlinson, Jr.

[11] Patent Number: 4,918,618

[45] Date of Patent: Apr. 17, 1990

[54] DISCRETE WEIGHT NEURAL NETWORK

[75] Inventor: Max S. Tomlinson, Jr., San Diego, Calif.

[73] Assignee: Analog Intelligence Corporation, Carlsbad, Calif.

[21] Appl. No.: 180,236

[22] Filed: Apr. 11, 1988

[51] Int. Cl.$^4$ .............................................. G06F 15/18
[52] U.S. Cl. .................................... 364/513; 364/200; 364/276.6; 364/807
[58] Field of Search ..................... 364/513, 200, 276.6, 364/807; 382/14, 15

[56] References Cited

U.S. PATENT DOCUMENTS

| | | | |
|---|---|---|---|
| 4,450,530 | 5/1984 | Llinas et al. | 364/513 |
| 4,752,906 | 6/1988 | Kleinfeld | 364/300 |
| 4,773,024 | 9/1988 | Faggin et al. | 364/300 |

Primary Examiner—Allen MacDonald
Attorney, Agent, or Firm—Calif Kip Tervo

[57] ABSTRACT

A Neural Network using interconnecting weights each with two values, one of which is selected for use, can be taught to map a set of input vectors to a set of output vectors.

A set of input vectors is applied to the network and in response, a set of output vectors is produced by the network. The error is the difference between desired outputs and actual outputs.

The network is trained in the following manner. A set of input vectors is presented to the network, each vector being propogated forward through the network to produce an output vector. A set of error vectors is then presented to the network and propagated backwards. Each Tensor Weight Element includes a selective change means which accumulates particular information about the error.

After all the input vectors are presented, an update phase is initiated. During the update phase, in accordance with the results of the derived algorithm, the selective change means selects the other weight value if selecting the other weight value will decrease the total error. Only one such change is made per set.

After the update phase, if a selected value was changed, the entire process is repeated. When no values are switched, the network has adapted as well as it can, and the training is completed.

4 Claims, 4 Drawing Sheets

DISCRETE WEIGHT NEURAL NETWORK

BACKGROUND OF THE INVENTION

1. Field of Invention

The invention relates in general to Neural Networks and more specifically to a mechanism which allows Neural Networks to utilize discrete weights.

2. Background Art

As used herein, a Neural Network is a system that produces an output vector that is a function of an input vector. The mapping function between the input and output vectors is learned. Ideally, an output vector should match a desired output vector, i.e., a target vector, after the training process; the difference between the output and target vectors can be used in adjustment mechanisms.

Original theoretical approaches towards neural networks are based upon the idea that when two neurons in the brain are active there is a correlation between them. One early rule developed by D. O. Hebb is described in his book "The Organization of Behaviour", Wiley, 1949. The Hebbian rule states that when two neurons are firing simultaneously an association link between them is strengthened. Accordingly, the next time either of the two neurons fires, the other one is more likely to fire also. However, the Hebbian rule is not a sufficient model to explain the learning process. Under the Hebbian rule, the connection strengths between neurons grow without bound. If maximums are placed on the connection strengths, these maximums are always reached.

Subsequently, the Perceptron Model was developed by Frank Rosenblatt, and is discussed in his book "Principles of Neurodynamics", Spartan, 1962. The Perceptron Model was originally believed powerful enough to enable a machine to learn in a human-like manner.

The Perceptron Model includes input, hidden and output layers; each comprised of one or more processing elements. In response to input stimuli, the input layer provides information to the hidden layer. Similarly, the hidden layer provides information to the output layer. Connections between the input and hidden processing elements are fixed; connections between the hidden and output processing elements are adjustable.

In the Perceptron Model, if the inputs are boolean (i.e. either zero or one), then the intended purpose of the hidden layer is to extract some kind of features from the input data. However, if the inputs to the Model are continuous numbers (i.e. having more than two distinct values, rather than just two boolean values), then the hidden layer is not used. Instead, the outputs of the input layer are connected directly to the inputs of the output layer.

In the Perceptron Model, all learning takes place in the output layer. Under the Perceptron Model many problems have been experimentally and mathematically shown to be representable by connection strengths between layers. Rosenblatt's Perceptron Learning Algorithm enables a neural network to find a solution if there exists a representation for that problem by some set of connection strengths. Rosenblatt's Perceptron Convergence Proof is a well known mathematical proof that a Perceptron System will find a solution if it exists.

In operation, the Perceptron Model modifies the strengths of the weighted connections between the processing elements, to learn an appropriate output response corresponding to a particular input stimulus vector. The modification of the connection weights occurs when an incorrect output response is given. This modification of the weights changes the transfer of information from the input to the output processing elements so that eventually the appropriate output response will be provided. However, through experimentation, it was discovered that the Perceptron Model was unable to learn all possible functions. It was hoped that these unlearnable functions were only pathological cases, analogous to certain problems that humans cannot solve. This is not the case. Perceptron Systems cannot represent and learn some very simple problems that humans are able to learn and represent.

An example of a problem that the Perceptron Model is unable to represent (without $2^N$ hidden processing elements, where N is the number of input nodes), and therefore cannot learn, is the parity or "exclusive-or" boolean function. To perform such a problem (with fewer than $2^N$ hidden processing elements) a system would require two layers of modifiable weights. The Perceptron System cannot properly adjust more than one layer of modifiable weights. It was speculated that no learning mechanism for a system with multiple layers of modifiable weights would ever be discovered because none existed (Minsky & Papert, 1969, in "Perceptrons").

(The problem with using $2^N$ hidden units is three-fold. First, since the hidden units, in the Perceptron Model, do not adapt, all the units must be present, regardless of the function which needs to be learned, so that all functions can be learned. Second, the number of units required grows phenomenally. For example, $2^{34}$ is approximately 17 billion, more neurons than in a human brain. This means that the largest parity problem the human brain could solve, if wired in this manner, would have at most 32 inputs. Third, the system would not generalize. Given two input/output vector pairs near one another, one trained and the other not, the system should be able to interpolate the answer from the first. With a large number of hidden units, it has been experimentally shown that this is not the case.)

Almost all adaptive neural systems share several features in common. Typically the processing elements of all systems have an output which is a function of the sum of the weighted inputs of the processing element. Almost all systems have a single layer of modifiable weights that affect the data transferred from the input to the output of the system.

The evolution of adaptive neural systems took a dramatic step forward with the development of an algorithm called "Back Propagation". This algorithm is fully described in the reference text "Parallel Distributed Processing, the Microstructure of Cognition", Rumelhart, Hinton, & Williams, MIT Press, 1986.

A back propagation system typically consists of three or more layers, each layer consisting of one or more processing elements. In one basic example, the system is comprised of an input layer, at least one hidden layer and an output layer. Each layer contains arbitrary, directed connections from the processing elements in the input layer to the hidden layer, and from the hidden layer to the output layer. There are no connections from processing elements to processing elements in the same layer nor connections from the output to the hidden layer nor from the hidden to the input layer; i.e. there are no cycles (loops) in the connection graph. (There are hypothesized mechanisms for networks with cycles in them, but they are not being scrutinized herein.)

In the Perceptron Model the idea of error was introduced. In a back propagation system, at each output processing element of the network, the error is quite easily realized. The error is typically the difference between an expected value and the output value. This error is used to modify the strength of the connection between a processing element and the output processing element. Ideally, this reduces the error between the expected output and the value output by the processing element in response to the input. The Perceptron Model lacks the ability to allocate an error value to the hidden processing elements and therefore cannot adjust the weights of any connections not coupled to an output processing element. In a system utilizing the Back Propagation algorithm, an error is assigned to the processing elements in hidden layers and the weights of the connections coupled to these hidden processing elements can be adjusted.

Several attempts have been and are being made to reduce Neural Networks to silicon. They are in general having difficulties. One of the major bottlenecks is how to store the interconnection values. If the values are pure analog, there are difficulties storing the values. If the values are stored digitally, there are problems with precision because of the need for very small adaptation steps.

Most Neural Networks algorithms, such as Back Propagation, Hopfield Nets, Perceptrons, and so on, utilize matrices of numbers to perform their work. The values of these numbers are usually not constrained significantly. Representing and storing these numbers in silicon has proven to be one of the more difficult problems when attempting to implement neural network algorithms. While the fixed values utilized in Hopfield Nets can be directly etched into silicon, there does not exist a solution when a weight must be modifiable and retain that modified value for an extended period of time (i.e. longer than minutes, ranging to years).

The primary difficulty existing today is that the value must be stored either as a value on a floating gate (as is used in ROM technologies), or on a simple capacitor. Both these mechanisms have detractions.

Floating gate technologies that store arbitrary analog voltages are experimental at this time. It is probable that within six months to four years these technologies will become feasible, primarily because of the need for them within neural networks.

The problem with capacitors is that they leak. The voltage values stored on a capacitor dissipate relatively quickly with time. This is generally unacceptable for long term storage. The only method around this is for training to proceed indefinitely, thereby making the dissipation less noticeable. It constrains the maximal size of the training set. The system should't forget what it learned at the beginning of the training set before it reaches the end! It also means that the entire training set and training support system must be shipped into the field, which is not always practical.

The invention described herein describes a method whereby these problems are eliminated.

SUMMARY OF INVENTION

This invention involves the derivation of a Discrete Weight algorithm and its implementation in a neural network. According to the invention, a neural network using interconnecting weights each with two values (such as 0 and 1 or such as −1.23 and 4.56), one of which is selected for use, can be taught to map a set of input vectors to a set of output vectors by using the feedback of error information.

A set of input vectors is applied to the network and in response, a set of output vectors is produced by the network. The error is the difference between desired outputs and actual outputs. The total error is the sum of the magnitudes of all the error vectors.

An algorithm is derived which shows for each interconnecting weight which of the two weight values in it should be selected so as to decrease the total error.

In the exemplary embodiment the neural network comprises an Input Layer comprising one or more Input Layer Processing Element, a Hidden Layer comprising one or more Hidden Layer Processing Elements, an Output Layer comprising one or more Output Layer Processing Elements, a Tensor Weight Layer comprising one or more Tensor Weight Elements, each Tensor Weight Element connecting an Input Layer Processing Element to a Hidden Layer Processing Element, and a Matrix Weight Layer comprising one or more Matrix Weight Elements, each Matrix Weight Element connecting a Hidden Layer Processing Element to an Output Layer Processing Element.

Broadly speaking, the network is trained in the following manner. One of the weight values in each Tensor Weight Element is selected as a starting value. Then a set of input vectors is presented to the network, each vector being propogated forward through the network to produce an output vector. In response thereto, a set of error vectors is presented to the network and propagated backwards to the Tensor Weight Elements. Each Tensor Weight Element includes a selective change means which accumulates particular information about the error. After all the input vectors are presented, an update phase is initiated.

During the update phase, depending on the accumulated error information, and other incidental information, and in accordance with the results of the derived algorithm, the selective change means selects the other weight value if selecting the other weight value will decrease the total error. Only one such change is made per set.

After the update phase, if a selected value was changed, the entire process is repeated. When no values are switched, the network has adapted as well as it can, and the training is completed.

DETAILED DESCRIPTION OF THE PREFERRED EMBODIMENTS

This invention provides a mechanism whereby the values of the weights inside Neural Networks can be stored as discrete values rather than as fully analog values. This invention details the method whereby an adaptation procedure can be applied to these weights.

This invention applies to neural networks that have an input layer of processing elements, an input layer of interconnecting weights, a hidden layer of processing elements, an output layer of interconnecting weights and an output layer of processing elements.

V.A.: Intuition

When performing adaptation there are two primary methods which have been utilized.

The first method is similar to that espoused by Darwin. In his view of Evolution, a biological process makes billions of guesses, and those guesses that are best, win. Hence, this form of adaptation is roughly the equivalent of random guessing performed in parallel. John Holland has studied this form of adaptation extensively, and calls it "Genetic Algorithms". In this method, one does not know which way one needs to go. If a system utilizing this method was supposed to go down a hill, at each point that it was on the hill, the system would take a large number of steps in different directions, and whichever directions went down the furthest would "win".

The second method is subtly different. At each point on that hill, instead of taking steps at each point, the system merely looks at the slope of the hill, and goes in the downhill direction. This is the mechanism is called Gradient Descent, and is used by Rumelhart in Back Propagation, for example. Since the slope of the hill can change quickly it is important to take small steps, so as to not overshoot and accidentally start running back uphill.

Neither of these mechanisms works well when utilizing discrete weights, which cannot make arbitrarily small increments. Taking a large number of steps in different directions, as Genetic Algorithms do, appears to be computationally intractable because of the extremely large number of permutations. In Back Propagation, taking discretely sized steps may cause the system to overshoot, because the step size might be too large.

Discrete Weights utilizes a different adaptation method. In a Gradient Descent algorithm, it is possible to adjust one variable at a time. The system, as long as there is no infinitely deep pit, will come to rest somewhere at some local lowest point in the hill, just as it would if all the weights are adjusted simultaneously It can be guaranteed that both variants will come to rest in the same place if the hills are shaped appropriately. If any particular variable has only two states, a high and low state, with associated high and low values, then the system could check to see if changing the variable to the opposite state would be beneficial. Unlike the Genetic Algorithm method, Discrete Weights does not need to actually perform the change to check if the change is worthwhile. Instead, through an analytic examination, it is possible to determine in advance whether or not making that change is beneficial.

This invention describes a new family of training algorithms which has a local minima convergence proof and which utilizes the digital storage of weights. In this manner many storage problems are essentially eliminated and issues of noise, accuracy, dynamic signal ranges, etc. are solved. Furthermore, the algorithm is guaranteed to terminate within a finite amount of time.

Some of the terms used in this disclosure are:

• Pattern Presentation: A pattern p is presented to the system by giving the inputs to the network an input vector, and the error inputs a corresponding error vector.

• Cycle: The period of time during which a pattern is presented and all machinations required for training a network associated with a single pattern presentation are performed.

• Epoch: The cycling through of all pattern presentations.

• Squash Function: A non-linear function which takes an input and produces an output dependent on that input. The range of the possible output values is constrained to be between finite upper and lower boundaries, often one and zero.

• p: The subscript p is used to signify that a particular pattern, p, is being presented to the network.

• j: The subscript j is used to signify an element which refers to the output layer.

• i: The subscript i is used to signify an element which refers to the hidden layer.

• x: The subscript x is used to signify an element which refers to the input layer.

• E: The total error present in the system.

• $O_{jp}$: Output of Output Processing Element j, during the presentation of pattern p.

• $O_{ip}$: Output of Hidden Processing Element i, during the presentation of pattern p.

• $N_{ip}$: The net input (as in the net summation of all the weighted inputs) to Hidden Processing Element i, during the presentation of pattern p.

• $O_{xp}$: Output of Input Processing Element i, during the presentation of pattern p. An input processing elements provides a fan-out of the inputs and hence $O_{xp}$ is equal to the input to the Input Processing Element, and could equivalently be called $I_{xp}$.

• $B_i$: The threshold or bias of Hidden Processing Element i. Generally is fixed and equal to zero.

• $T_{jp}$: The target value for an Output Processing Element j, in response to a particular input pattern p.

• $W_{ji}$: A weight value connecting Hidden Processing Element i and Output Processing Element j.

• $W_{ix}$: A weight value connecting Input Processing Element x and Hidden Processing Element i.

The mathematical values may have a Δ placed in front of them. The Δ indicates either a real change, a potential change or a desired change; the exact interpretation will be apparent from the surrounding text.

Figure 1:
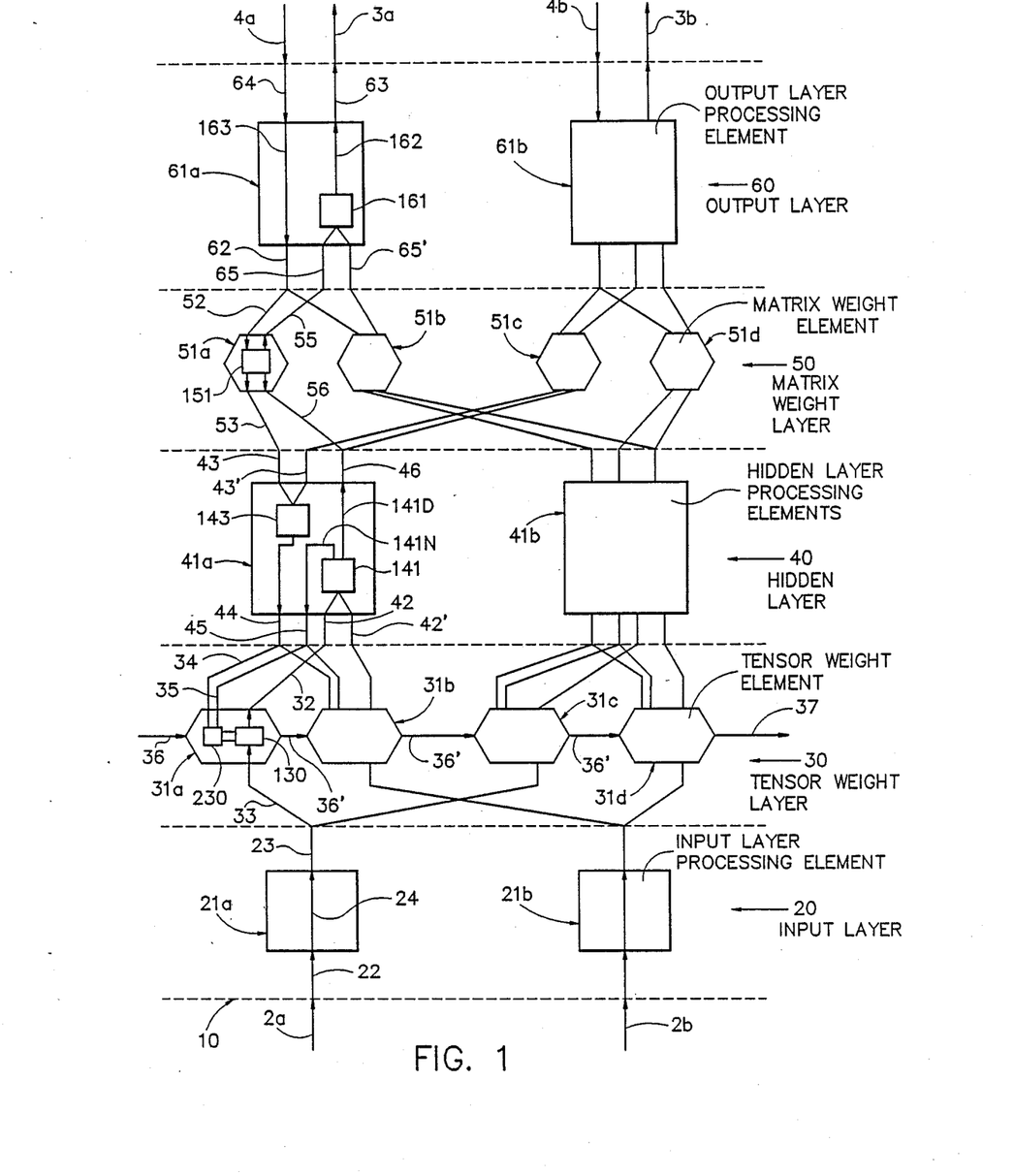
FIG. 1 is a graphical representation of a small representative Discrete Weight Neural Network system.

FIG. 1 is a graphic representation of a small, representative, Discrete Weight Neural Network system, denoted generally as 10, and is used herein as an example to demonstrate the mechanisms associated with the Discrete Weight Neural Network algorithms.

Discrete Weight Neural Network 10 is used for the mapping of an Input Vector to an Output Vector, where the mapping function is adaptively learned, by the application of an externally applied Error Vector.

Discrete Weight Neural Network 10 is generally comprised of an Input Layer, denoted generally as 20, comprising two Input Layer Processing Elements, denoted generally as 21a and 21b; a Tensor Weight Layer, denoted generally as 30, comprising four Tensor Weight Elements, denoted generally as 31a, 31b, 31c and 31d; a Hidden Layer, denoted generally as 40, comprising two Hidden Layer Processing Elements, denoted generally as 41a and 41b; a Matrix Weight Layer, denoted generally as 50, comprising four Matrix Weight Elements, denoted generally as 51a, 51b, 51c and 51d; and an Output Layer, denoted generally as 60, comprising two Output Layer Processing Elements, denoted generally as 61a and 61b.

Network 10 receives an Input Vector comprised of elements 2a and 2b. Network 10 produces an Output Vector comprised of elements 3a and 3b. Network 10 receives an Error Vector comprised of elements 4a and 4b.

Each Input Layer Processing Element 21a and 21b has an input data line 22 for receiving an element of the Input Vector, an data output line 23, and transfer function means, such as line 24, for receiving Input Vector information from input data line 22 and producing an output data value data output line 23, which is dependent on Input Vector information.

Each Hidden Layer Processing Element 41a, 41b has two weighted data input lines 42 and 42' for receving weighted data input values; two weighted error input lines 43 and 43' for receiving weighted error input values; a data output line 46 for transmitting a data output value; an error output line 44 for transmitting an error output value; a net data feedback output line 45 for transmitting a net data feedback output value; a summation means, denoted generally as 141, for combining the weighted data input values on weighted data inputs lines 42 and 42', and providing a net data feedback value on net data feedback output line 45 via line 141N, and providing a data output value on data output line 46 via function line means 141D (usually a thresholding function, such that if the net data value is greater than a threshold value, it will produce an output of one, and if the net data value is less than said threshold value, it will produce an output of zero); and means, denoted generally as 143, for combining the weighted error input values (usually a simple weighted averaging), and providing an error value on error output line 44.

Each Output Layer Processing Element 61a, 61b has two weighted data input lines 65 and 65' for receiving weighted data input values; a data output line 63 for transmitting a data output value as an element of the Output Vector; an error input line 64 for receiving an element of the Error Vector; an error output line 62 for transmitting an error output value; error transfer means, such as wire 163, for transferring error information from error input line 64 to the error output line 62, and means, such as summation means 161, for combining the weighted data input lines 65 and 65' and producing a net data feedback value; activation function means, such as wire 162, for producing an output data value which is a function of said net data feedback value, and placing said output data value on data output line 63.

Each Matrix Weight Element 51a, 51b, 51c and 51d has a data input line 56 connected to a data output line 46 of a Hidden Layer Processing Element 41, a weighted data output line 55 connected to a weighted data input line 65 of an Output Layer Processing Element 61, for transmitting a weighted data output value to the Output Layer Processing Element; an error input line 52 connected to an error output line 62 of an Output Layer Processing Element 61, for receiving an error output value from the Output Layer Processing Element 61; a weighted error output line 53 connected to a weighted error input line 43 of a Hidden Layer Processing Element 41, for transmitting a weighted error output value to the Hidden Layer Processing Element 41 as a weighted error input value; a weighting means, generally denoted 151, including a weight value (not drawn), means for transferring the data input value from data input line 56 in proportion to a weight value (not drawn) to the weighted data output value on weight data output line 55 (the weight value may be a fixed value, and the transfer means be a multiplication device which takes said fixed number and data input value, multiplies them and then transfers that value to the weighted data output value); and transfer function means for transferring the error input value from error input line 52 in proportion to the weight value (not drawn) to the weighted error output value on weighted error output line 53.

Each Tensor Weight Element 31a, 31b, 31c and 31d has a data input line 33 connected to a data output line 23 of an Input Layer Processing Element 21, for receiving a data output value from the Input Layer Processing Element 21 as a data input value; a weighted data output line 32 connected to a weighted data input line 42 of a Hidden Layer Processing Element 41, for transmitting a weighted data output value to the Hidden Layer Processing Element 41 as a weighted data input value; a selective weighting means, denoted generally as 130, outputs on data output line 32 a weighted value of the data received on data input line 33. Selective weighting means 130 and other elements of a Tensor Weight Element will be more fully described later. The structure illustrated in FIG. 1 has been presented now to provide a better understanding of the following derivation.

The following derivation is for introductory explanatory purposes as to how a simplified form of a Discrete Weight training mechanism works. This section shows that if a system is built according to the principles outlined herein, the total Error over all patterns will monotonically decrease. This section utilizes linear threshold activation functions in the hidden layer.

For purposes of explanatory discussion, assume the following for this network:

- a matrix weight value 151 has a value of $-1$, 0 or 1, only.
- a tensor weight high value is 1, and a tensor weight low value is 0.
- the activation function 69 for the output layer is linear.
- the activation function in summation means 141 of the hidden layer 40 is a linear threshold unit (LTU), with the threshold value fixed at 0, i.e. if the net input to the processing element is greater than or equal to zero the processing element shall output a 1, and if the net input is less than zero, the processing element shall output a 0.
- the activation function 25 of the input layer is linear.
- each Input Vector element value is either 0 or 1.

Not all of these assumptions are necessary, and some will be removed in the next section. They are assumed here for clarity of explanation. Also, although the following mathematical derivation is explained with reference to small exemplary network 10, it should be readily apparent that the derivation applies to much larger networks.

To start off, a traditional error function is used:

$$E = \sum_{jp} (T_{jp} - O_{jp})^2 \qquad (1)$$

The above states that the Total Error E is equal to the sum over all the patterns, over all the output processing elements of the difference between the Target and Output at that processing element, squared.

Instead of taking the partial derivative of equation 1 with respect to a weight or time, as is done in a conventional Back Propagation derivation, assume that a single weight is changed, by some amount $\Delta W_{ix}$. This $\Delta W_{ix}$ will possibly affect every processing element above it, changing the outputs, etc, and finally changing the error value. On the output layer, let the amount of change attributable to this change of a single $\Delta W_{ix}$ be represented by the plethora of output changes, denoted $\Delta O_{jp}$, and the change of the error be denoted $\Delta E$. Given this, the following expression can be stated:

$$\Delta E = E_{new} - E_{old} \quad (2)$$

$$= \left(\sum_{jp} (T_{jp} - O_{jp} - \Delta O_{jp})^2\right) - \left(\sum_{jp} (T_{jp} - O_{jp})^2\right) \quad (3)$$

The first term of the right hand side is the new error, the second term is the old error; the difference is the change in the error, attributable to a single weight change $\Delta W_{ix}$. Simplifying algebraically gives:

$$= -2 \sum_{jp} \left(T_{jp} - O_{jp} - \frac{\Delta O_{jp}}{2}\right) \Delta O_{jp} \quad (4)$$

Since it is desired that $\Delta E < 0$ (because it is desired to decrease the total error, when a weight is changed), equation 4 becomes:

$$0 < \sum_{jp} \left(T_{jp} - O_{jp} - \frac{\Delta O_{jp}}{2}\right) \Delta O_{jp} \quad (5)$$

and algebraic manipulation gives:

$$\sum_{jp} (T_{jp} - O_{jp}) \Delta O_{jp} > \frac{1}{2} \sum_{jp} \Delta O_{jp}^2 \quad (6)$$

Since a single input weight $W_{ix}$ is being adjusted, it will affect only a single hidden output value (if it is affected at all). This implies that the change in the output values of the output processing elements $\Delta O_{jp}$ is affected by a single $\Delta O_{ip}$, which means the following can be stated:

$$\Delta O_{jp} = W_{ji} \Delta O_{ip} \quad (7)$$

Substituting equation 7 into equation 6 gives:

$$\sum_{jp} (T_{jp} - O_{jp}) W_{ji} \Delta O_{ip} > \frac{1}{2} \sum_{jp} W_{ji}^2 \Delta O_{ip}^2 \quad (8)$$

Since $W_{ji}^2$ is independent of the index p, and $\Delta O_{ip}^2$ is independent of the index j, algebraic manipulation can be performed which shows:

$$\sum_{p} \Delta O_{ip} \sum_{j} (T_{jp} - O_{jp}) W_{ji} > \frac{1}{2} \left(\sum_{p} \Delta O_{ip}^2\right)\left(\sum_{j} W_{ji}^2\right) \quad (9)$$

and $$\frac{\sum_{p} \Delta O_{ip} \frac{\sum_{j} (T_{jp} - O_{jp}) W_{ji}}{\sum_{j} W_{ji}^2}}{\sum_{p} \Delta O_{ip}^2} > \frac{1}{2} \quad (10)$$

Define $E_{ip}$ as follows:

$$E_{ip} = \frac{\sum_{j} (T_{jp} - O_{jp}) W_{ji}}{\sum_{j} W_{ji}^2} \quad (11)$$

Note that because of the assumptions about the values of $W_{ji}$ in this section, $E_{ip}$ is just the average value of the error on the output processing elements that have non-zero weight connections to the hidden processing element. Equation 11, by substituting the new definition of $E_{ip}$ into it, simplifies to:

$$\frac{\sum_{p} \Delta O_{ip} E_{ip}}{\sum_{p} \Delta O_{ip}^2} > \frac{1}{2} \quad (12)$$

To further simplify equation 12, $\Delta O_{ip}$ must be removed from the equation. By observation, it can be seen that $\Delta O_{ip}$ will be 1 whenever the net input to the LTU is less than zero before the weight change, and greater than zero after the weight change. Similarly, $\Delta O_{ip}$ will be $-1$ whenever the net input to the LTU is greater than zero before the weight change, and less than afterwards. If one of these two conditions is not met, the output of the LTU will not change because of the weight change. This can be stated as:

$$\Delta O_{ip} = \begin{cases} 1 \text{ if } 0 > N_{ip} \,\&\, N_{ip} + \Delta N_{ip} > 0 \\ -1 \text{ if } 0 < N_{ip} \,\&\, N_{ip} + \Delta N_{ip} < 0 \\ 0 \text{ otherwise} \end{cases} \quad (13)$$

When $\Delta O_{ip}$ is zero, is adds nothing to the summations. Hence, the summations can be done over only the non-zero values of $\Delta O_{ip}$. One other major thing needs to be observed: If a weight is 0, it can only transition to 1. Hence, $\Delta N_{ip}$ can only be positive or zero (since the inputs are positive or zero). Similarly, if a weight is 1, $\Delta N_{ip}$ can only be negative or zero. This means, if a weight is 0, $\Delta O_{ip}$ can only be $+1$, and if a weight is 1, $\Delta O_{ip}$ can only be $-1$, when that weight is changed. Hence, for a particular weight, the system needs only watch for a $\Delta O_{ip} = 1$ or $\Delta O_{ip} = -1$, depending on the value of the weight.

Assume that a weight is 0; therefore, for this case, only those cases where $\Delta O_{ip} = 1$ need be included in the summation, as in:

$$\frac{\sum\limits_{\Delta O_{ip}^2 = 1} E_{ip}}{\sum\limits_{\Delta O_{ip}^2 = 1} 1} > \frac{1}{2} \quad (14)$$

This simplifies to:

$$\underset{\substack{\text{patterns } p \text{ where} \\ N_{ip} < 0 \,\&\, \\ 0 < N_{ip} + \Delta W_{is} O_{sp}}}{\text{average}} E_{ip} > \frac{1}{2} \quad (15)$$

Equation 15 states that whenever the average error ($E_{ip}$) averaged over all those patterns in which changing $W_{ix}$ would make a difference is greater than, then $W_{ix}$ should be changed from its low value to its high value (i.e. 0 to 1).

For weights with a value of 1, similarly:

average $E_{ip} < -\frac{1}{2}$ (16)

patterns $p$ where $N_{ip} + \Delta W_{is}O_{sp} < 0$ &

$0 < N_{ip}$

Similar to equation 15, equation 16 states that whenever the average error ($E_{ip}$) averaged over all those patterns in which changing $W_{ix}$ would make a difference is less than —, then $W_{ix}$ should be changed from its high value to its low value (i.e. 1 to 0).

And that's how single bit changes are made. If all these calculations are performed in parallel, somehow, or serially on a Von Neuman computer, an entire epoch of all of the patterns is presented to the network and then one of the weights that may be changed is changed. It does not matter which weight is changed, as any one picked randomly is sufficient, because any one that may be changed will lower the error.

V.B: LTU Implementation of Discrete Weight Algorithm

With reference once more to the drawings, FIG. 1 has been used to illustrate the basic structural topology of a small, exemplary Neural Network for exploiting the Discrete Weight Neural Network algorithm. It should be noted that the term "layers" is figurative and that in actual implementations, different topologies may be appropriate, "line" implies any information transfer mechanism and "value" implies any method of representation, such as bits in a computer program, volts on a physical wire, or frequencies of light.

The forward propagation of data through the network is as follows.

An element of the Input Vector is applied to each of input lines 2a and 2b and is propagated to Input Processing Elements 21a and 21b. The Input Vector element's value is propagated forward through the Input Processing Element via transfer function means, such as line 24, to the output data line 23. Although a simple line 24 is shown, the transfer function means may operate on the input value rather than passing it along directly. For example, transfer function means 24 may be a squash function.

Output data line 23 fans out into data input lines 33 of its connected Tensor Weight Elements. Selective weighting means 130 receives the data input value from data input line 33 and, in response thereto, outputs on weighted data output line 32 a weighted data value which is proportional to the data input value.

Summation means 141 receives via weighted data input lines 42 the weighted data values on weighted data output lines 32. Summation means 141 typically performs a linear summation (of the weighted data input values) to provide a net data feedback value on net data feedback output line 45 via line 141N, and then performs a non-linear transformation of the resultant summation value to provide an output data on data output line 46 via line 141D. In the case of the LTU implementation, the non-linear transformation of the resultant summation value is a linear thresholding, such that when the summation value is above a threshold value line 141D outputs a 1, and when the summation value is less or equal to the threshold value, line 141D outputs a 0. Summation means 141 may perform different, but similar operations in different situations, such as by performing a non-linear operation first, then by deriving, using linear mechanisms, both the output data value and the net data feedback value (as is used in the Spike Model implementation, discussed later in this disclosure).

Weighting means 151 receives a data input value via data input line 56 from connected data output line 46. Weighting means 151 provides on weighted data output line 55 a data output value proportional to said data input value from data input line 56.

Summation means 161 receives via weighted data input lines 65 the values on weighted data output lines 55. The summation means 161 typically performs a linear summation of the weighted data input values, however, it may instead perform some non-linear combination. Summation means 161 provides a net data feedback value to activation function means, such as wire 162, which produces a data output value on data output line 63. Activation function means 162 may be, instead of a simple wire, a squash function dependent on said net data feedback value.

Each data output line 63 provides an element of the Output Vector 3.

Thus, the forward propagation of data information through network 10 has been described.

The backward flow of error information through network 10 will now be described.

Typically, Error Vector 4 is the difference between a Target Vector and the Output Vector 3, however, the exact relationship between the Target, Output and Error vectors may be of several forms, such as each vector element of the Error Vector being the sign of the difference between the elements of the Target and Output vectors.

Each output processing element receives its corresponding element of Error Vector 4 via error input line 64. Error transfer means, such as wire 163, receives from error input line 64 an error input value and provides, dependent on the error input value, an error output value on error output line 62.

Weighting means 151 receives an error input value via error input line 52 from error output line 62, and provides a weighted error value on weighted error output line 53 which is proportional to the error input value.

Combining means 143 receives weighted error input values via lines 43 from connected lines 53 of Matrix Weight Elements 51 and produces an output error value on error output line 44. Combining means 143 generally will produce the weighted average of said error input values, though in various situations it will perform other combining functions.

Figure 2:
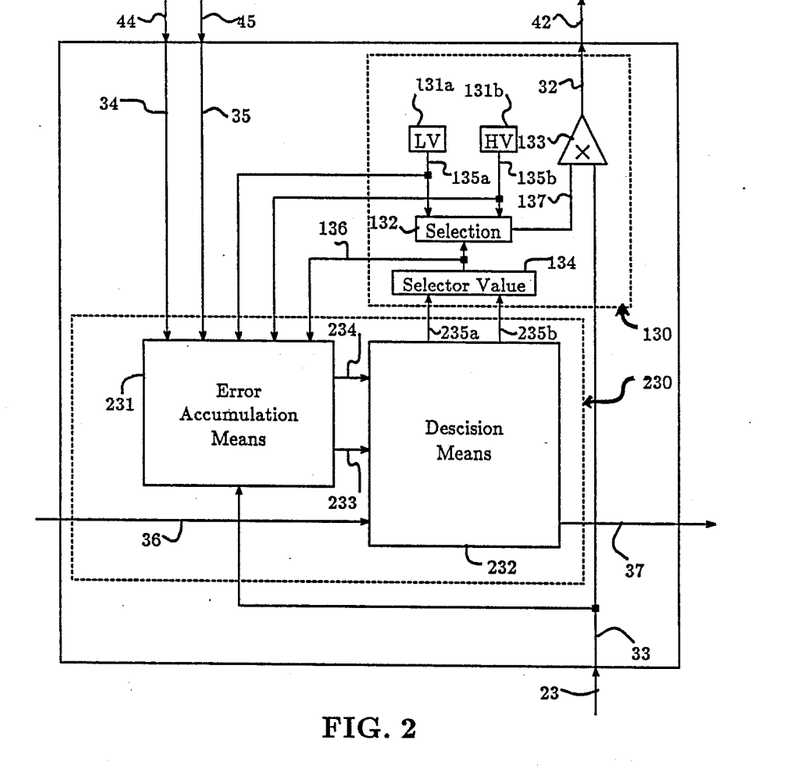
FIG. 2 is a graphical representation of a Tensor Weight Element of FIG. 1.

The remainder of the backwards propagation of error continues with FIG. 2.

FIG. 2 is a graphical representation of a Tensor Weight Element 31 generally comprised of selective weighting means, denoted generally as 130, and selector change means, denoted generally as 230.

Selective weighting means 130, includes low weight value means 131a for storing a low weight value; high weight value means 131b for storing a high weight value; selector value means 134 for storing a selector value; selection means 132 connected to low weight value means 131a via low weight value line 135a, connected to high weight value means 131b via high weight value line 135b, connected to selector value means 134 via selector value line 136, for selecting the low weight value or the high weight value dependent on selector value and for producing the selected weight value on selected weight value line 137; and multiplication means 133 for receiving input value from input line 33 and the selected weight value and producing a weighted data output value on weighted data output line 32.

Broadly speaking, selector change means 230 performs the function of determining if changing the selector value (whereby the non-selected weight value becomes the selected weight value) will decrease the total error.

Selection change means 230 is comprised of error accumulation means 231 and decision means 232.

Error accumulation means 231 receives via net data feedback input line 35 a net data feedback input value from net data feedback output value line 45 of its connected hidden processing element 41, receives via error input line 34 an error input value from error output value line 44 of its connected hidden processing element 41, receives via low weight value line 135a the low weight value, receives via high weight value line 135b the high weight value, receives via selector value line 136 the selector value, produces a first summation value on first summation line 234, produces a second summation value on second summation line 235. The first summation value and the second summation value are produced dependent on all the received values of error accumulation means 231. Broadly speaking, the first summation value is the upper summation value represented in equation 12, while the second summation value is the lower summation value. There are a variety of mechanisms that will produce the appropriate results, and a typical such mechanism is detailed in FIG. 3a.

Figure 3A:
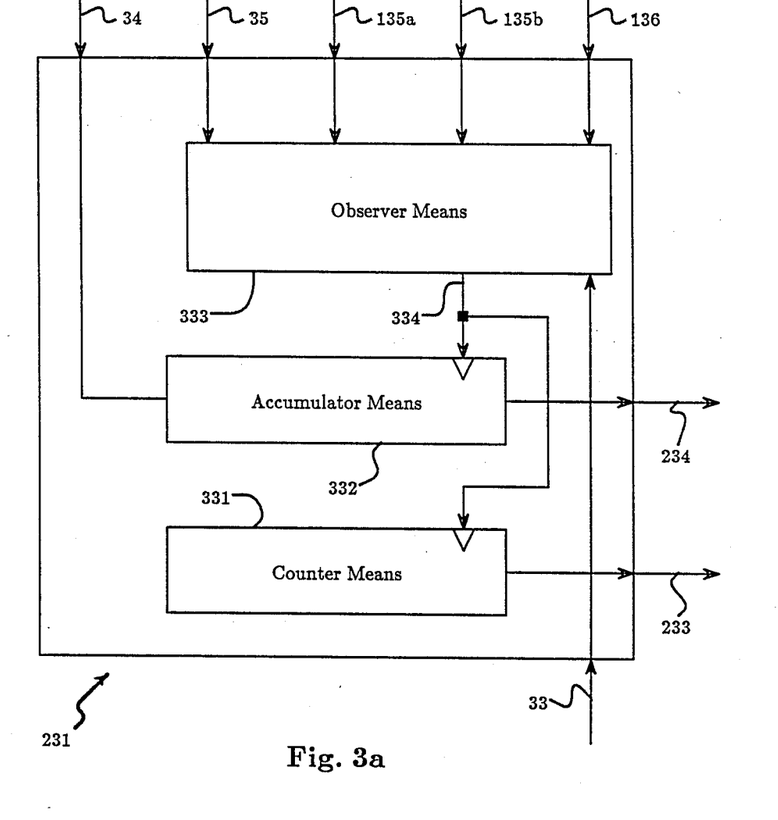
FIG. 3a is a graphical representation of a diagrammatic representation of a typical circuit for implementing the Error Accumulation means of FIG. 2.

FIG. 3A is a diagrammatic representation of a typical circuit which could implement an Error Accumulation Means for a network which has Linear Threshold Units in the Hidden Layer.

Error accumulation means, generally denoted as 231, comprises observer means 333, accumulator means 332 and counter means 331.

Observation means 333 receives via net data feedback input line 35 a net data feedback input value from net data feedback output line 45 of its corresponding hidden layer processing element 41, receives via low weight value line 135a the low weight value, receives via high weight value line 135b the high weight value, receives via selector value line 136 the selector value and receives via data input line 33 a data input value from data output line 23 from its corresponding input layer processing element 21. Observation means 333 produces on perform accumulation line 334 a perform accumulation signal, which indicates that if the selector value were to change, the output of the connected hidden processing element would change, and that therefore the summations should occur.

Accumulator means 332 receives via error input line 34 an error input value from error output line 44 of its connected hidden layer processing element 41. Accumulator means 332 produces a first summation value on first summation line 234. In response to the perform accumulation signal, accumulator means 332 updates first summation value by adding the error input value to the first summation value.

Counter means 331 produces a second summation value on second summation line 233. In response to the perform accumulation signal, counter means 331 updates second summation value by adding one to the second summation value.

At this point, one cycle has been completed. That is, the system has received an input vector, has produced an output vector, has received an error vector and has possibly modified the accumulators and counters of the network. The system has not, as of yet, changed which weight values are selected in any of the tensor weight elements.

After an epoch of all such pattern presentations, decision means 232 determines if changing the selector value in its Tensor Weight Element will decrease the total error. This is initiated by providing an update signal to the network on update signal line 36. This update signal is sent to each Tensor Weight Element respectively, until a first Tensor Weight Element changes its selector value. If no Tensor Weight Element can change its selector value the network has finished its adaptation and training to the best level that it can. Once a Tensor Weight Element changes its selector value the adaptation process continues again, by clearing the accumulators and counters and inputing another epoch of patterns presentations.

Decision means 232 receives a first summation value from first summation line 234, a second summation value from second summation line 235, and an update signal from update signal line 36. Decision means 232 produces a set low value on set high value line 235a, a set high value on set low value line 235b and a next update signal on next update signal line 37. Broadly speaking, the set high value is produced whenever the first summation means, divided by the second summation means, is greater than some constant, and the set low value is produced whenever the first summation means, divided by the second summation means, is less than some different constant. A block circuit diagram for a circuit which implements such a function is detailed in FIG. 3b.

Figure 3B:
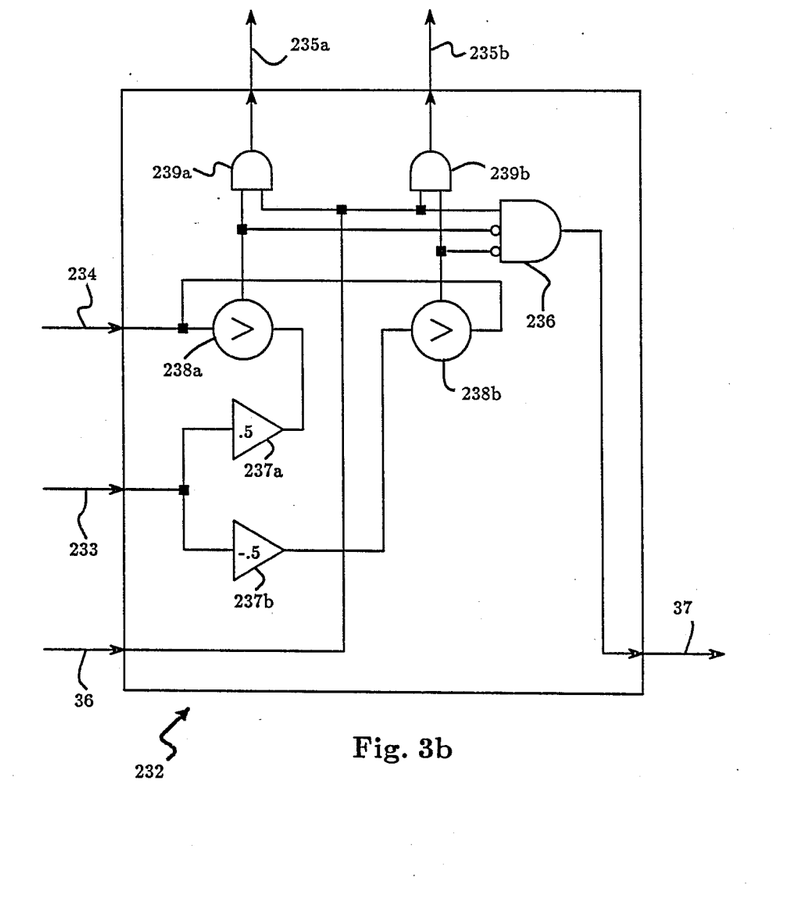
FIG. 3b is a graphical representation of a diagrammatic representation of a typical circuit for implementing the Descision Means of FIG. 2.

FIG. 3B is a diagrammatic representation of a typical circuit which could implement an Decision Means for a network which has Linear Threshold Units in the Hidden Layer.

Decision means, denoted generally as 232, is comprised of low AND gate means 239a, low comparison means 238a, low modifier means 237a, high AND gate means 239b, high comparison means 238b, high modifier means 237b and signal next AND gate means 236.

Low modifier means 237a receives second summation value from second summation line 233 and produces an output which is ½ of the second summation value.

High modifier means 237b receives second summation value from second summation line 233 and produces an output which is −½ of the second summation value.

Low comparison means 238a receives from first summation line 234 a first summation value, for comparing first summation value with the output of low modifier means 237a and produces an output when first summation value is greater than the output of low modifier means 237a.

High comparison means 238a receives from first summation line 234 a first summation value, for comparing first summation value with the output of high modifier means 237b and produces an output when first summation value is less than the output of high modifier means 237b.

Low AND gate means 239a receives an update signal via update weight line 36 for producing a set low value on the set low value line 235a when the output on the low comparison means 238a and the update signal are both present.

High AND gate means 239b receives an update signal via update weight line 36 for producing a set high value on the set high value line 235b when the output on the high comparison means 238b and the update signal are both present.

Signal next AND gate means 236 receives an update signal via update weight line 36 for producing a next update signal on next update signal line 37 when the output of the low comparison means 238a is not present and the output of the high comparison means 238b is not present and the update signal is present.

Therefore, if a Tensor Weight Element does not change its weight selector value, an update signal is sent to the next Tensor Weight Element via line 37, to update signal line 36 of the next Tensor Weight Element, causing the next Tensor Weight Element to check if it should change its weight selector value, and so on. If a Tensor Weight Element does change its weight selector value no update signal is sent to the next Tensor Weight Element, and the update portion of the mechanism terminates. (It is readily apparent, that unless the system is to wait a some length of time, some mechanism is needed to indicate that a change has been made; there are many trivial mechanisms that would work, and shall not be discussed herein.)

If the update signal propagates through all Tensor Weight Elements, then, by definition, changing any single weight selector value will cause the total error to rise. Hence the network cannot improve its performance any further, and training should stop.

V.C: Discrete Weight Neural Networks

The following is an expansion of the derivation of the previous section, and shows that the derivation holds even when most of the assumptions are eliminated.

Multiple bits are often required, as, for example, with thresholds. What is needed is a mechanism that can store arbitrary precision weights using digital mechanisms. The problem would at first appear to be that a weight at different times may need to go up or down. The mechanism espoused previously used the simplification that a single bit weight can move in only one direction, hence it need look only for possible movement in one direction.

The assumptions given in the previous section were overly restrictive. One of the assumptions was that the values of the input weights were to be taken only from the set {0,1}. What is required is not that the weights be only zero and one in value, but rather that a particular weight have only two values, a high value and a low value. So, a weight might have the two values {−23.45, 12.9876}, rather than {0,1}. This means that looking in a single direction is still possible, just that the difference between the high and low values is no longer arbitrary fixed.

A second, implicit, assumption was made: that there was only a single weight between two processing elements. This, again, is not necessary. It is quite reasonable to connect more than a single weight between two processing elements; this is not necessary when the weights have arbitrary precision, but is a solution when the weights have only a finite number of bits. Each weight can therefore determine independently if it should change. This mechanism is somewhat akin to successive approximation.

The derivation is completely identical to that given in the previous section, except several assumption may be generalized to allow a more flexible system.

The first generalization is that $\Delta W_{ix}$, instead of only being able to be $\pm 1$, it can now be any range of values. Similarly, no $O_{xp}$ is constrained in the particular values it may take on. The primary difference comes in noting that $\Delta O_{ip}$ is calculated from $\Delta N_{ip}$ and $N_{ip}$, and that $\Delta N_{ip}$ is not constrained in the range of values that it may take on. The primary difference is that the larger $\Delta N_{ip}$ is, the greater the probability that $O_{ip}$ will be affected by $\Delta N_{ip}$. Since the range of $\Delta N_{ip}$ is not constrained, the product of $\Delta W_{ix}$ and $O_{xp}$ is similarly not constrained. For implementation purposes, it is reasonable to require that $O_{xp}$ be always positive, without a significant loss of generality, since this will in most cases reduce the circuit complexity, without causing undue hardship in the creation of input patterns.

The second generalization is that instead of requiring only a single connection to be made between the input and hidden layers, multiple connections via the tensor weight elements may be made. Since the values of the weights can now be seen to be arbitrary, we can choose the low and high values for the first weight between two processing elements to be [0,1], the second [0,2], the third [0,4], etc. This means that we can have a finite-range interconnection scheme with precision set by a designer. This has the advantage that an appropriate number of bits of significance can be designed into the system. It remains an open question to determine exactly how many bits are required to solve a particular mapping problem; however, it now is quite calculatable how many bits of precision are required to accurately utilize all the bits in the tensors.

One significant difference and advantage of the Discrete Weight Neural Network algorithm of this invention over successive approximation is that no actual test is made (such as where a bit is flipped, all the patterns are again presented, and a check is made of the error to see if it declines). All tests of whether a bit is may be flipped can be done in parallel, locally to the tensor weight element.

The Discrete Weight Neural Network algorithm is not a strict gradient descent algorithm. For example, Back Propagation might be stuck in a local minima, because only the low order bits can be changed. However, if there is a deeper well, off in the distance of one of the more significant bits, this Discrete Weight algorithm will be able to change the higher order bit to move to that well. So, this algorithm can get out of some local minima that Back Propagation cannot. It is not guaranteed to find a global minima, as it is possible that two (or more) bits need to be changed, and any single change causes the error to rise. However, all gradient descent algorithms suffer from this disease (including Back Propagation).

V.D: Discrete Weight Spike Model

Using a pulsed spike train (Spike Model) for data propagation in the above described Discrete Weight Neural Network environment should results in improved performance. The main difference between the Spike Model and the previous model is that for the Spike Model the activation function for the hidden layer, should now be a continuous squash function rather than the discontinuous function of a linear threshold unit, as in:

$$f(N_{ip}) = 1 - e^{-N_{ip}} \qquad (17)$$

For equation 17 it is necessary to assume that $W_{ix} > 0$. To eliminate this assumption, it is necessary to utilize an activation function of two parameters, a positive net summation of all lines being modified by positive weights, and a negative net summation of all lines being modified by negative weights. The extra mathematical baggage is not illuminating, and is not recounted herein. The extended derivation is straightforward. Repeating equations 11 and 12:

$$E_{ip} = \frac{\sum_j (T_{jp} - O_{jp}) W_{ji}}{\sum_j W_{ji}^2} \qquad (18)$$

$$\frac{\sum_p \Delta O_{ip} E_{ip}}{\sum_p \Delta O_{ip}^2} > \tfrac{1}{2} \qquad (19)$$

It is necessary to determine $\Delta O_{ip}$ under these conditions. This can be done by recognizing that the output of processing element i during pattern p will change if the net input to the node changes, and it will change by the difference between the new and the old, as in:

$$\begin{aligned}
\Delta O_{ip} &= f(N_{ip} + \Delta N_{ip}) - f(N_{ip}) & (20)\\
&= (1 - e^{-N_{ip} - \Delta N_{ip}}) - (1 - e^{-N_{ip}}) & (21)\\
&= e^{-N_{ip}}(1 - e^{-\Delta N_{ip}}) & (22)
\end{aligned}$$

The value of $\Delta N_{ip}$ is as before:

$$\Delta N_{ip} = \Delta W_{ix} O_{xp} \qquad (23)$$

Equations 22 and 23 can be placed into equation 19 to give:

$$\frac{\sum_p e^{-N_{ip}}(1 - e^{-\Delta W_{is}O_{sp}}) E_{ip}}{\sum_p (e^{-N_{ip}}(1 - e^{-\Delta W_{is}O_{sp}}))^2} > \tfrac{1}{2} \qquad (24)$$

If all $O_{xp}$ are limited to be only 0 or 1, then the summation can be done over those inputs when $O_{xp}$ is 1, as those times when $O_{xp}$ is 0, they add nothing to the summation. Furthermore, since $\Delta W_{ix}$ is independent of the summation variable p, the resulting $1 - e^{-\Delta W_{ix}}$ terms can be brought out of the summations, giving:

$$\frac{\sum_{O_{sp}^p=1} e^{-N_{ip}} E_{ip}}{\sum_{O_{sp}^p=1} e^{-2N_{ip}}} > \frac{(1 - e^{-\Delta W_{is}})}{2} \quad (\text{for } \Delta W_{ix} > 0) \qquad (25)$$

$$\frac{\sum_{O_{sp}^p=1} e^{-N_{ip}} E_{ip}}{\sum_{O_{sp}^p=1} e^{-2N_{ip}}} < \frac{(1 - e^{-\Delta W_{is}})}{2} \quad (\text{for } \Delta W_{ix} < 0) \qquad (26)$$

Whenever equation 25 is true, asynchronously changing the value of the weight from its low value to its high value will cause the error to monotonically decrease. Whenever equation 26 is true, asynchronously changing the value of the weight from its high value to its low value will cause the error to monotonically decrease.

Therefore, it has been shown that it is not required that the hidden layer of processing elements be composed of linear threshold units; rather it has been shown that there exists at least one (and there are many more examples) of a continuous activation function. All that is required in the Discrete Weight algorithm is a method of determining if equation 12 is valid. It should also be similarly apparent to the reader that the output layer can be non-linear, by following similar derivational methods.

Although particular embodiments of the invention have been illustrated and described, modifications and changes will become apparent to those skilled in the art, and it is intended to cover in the appended claims such modifications and changes as come within the true spirit and scope of the invention.

What I claim is:

1. A Discrete Weight Neural Network system for the mapping of a received Input Vector to a produced Output Vector, where the mapping function is adaptively learned by the application of a received Error Vector and a received update signal; said Discrete Weight Neural Network comprising:

(1) an Input Layer comprising one or more Input Layer Processing Elements;

(2) a Tensor Weight Layer comprising one or more Tensor Weight Elements;

(3) a Hidden Layer comprising one or more Hidden Layer Processing Elements;

(4) a Matrix Weight Layer comprising one or more Matrix Weight Elements;

(5) an Output Layer comprising one or more Output Layer Processing Elements;

(6) each Input Layer Processing Element comprising:

(a) an input data line means for receiving as input data value an element of the Input Vector (b) an output data line means for outputing a data output value; and (c) means for transferring the input data from the input data line means to the output data line means;

(7) each Hidden Layer Processing Element comprising:

(a) one or more weighted data input line means for receiving weighted data input values;

(b) one or more weighted error input line means for receiving weighted error input values;

(c) a data output line means for transmitting a data output value;

(d) a net data feedback output line means for transmitting a net data feedback output value;

(e) an error output line means for transmitting an error output value;

(f) means for combining weighted data input values, for producing said data output value, and for producing said net data feedback output value; and (g) means for combining weighted error input values and for producing said error output value;

(8) each Output Layer Processing Element comprising:

(a) one or more weighted data input line means for receiving weighted data input values;

(b) a data output line means for transmitting a data output value as an element of the Output Vector;

(c) summation means connected to said weighted data input lines for receiving the weighted data input value and for producing the data output value as a sum thereof;

(d) an input error line means for receiving an element of the Error Vector;
(e) an output error line means for transmitting an error output value; and
(f) means for transferring error information from said input error line means to said output error line means;

(9) each Matrix Weight Element comprising:
(a) a data input line means connected to the data output line means of one of said one or more Hidden Layer Processing Elements for receiving the data output value from that Hidden Layer Processing Element as a data input value;
(b) a weighted data output line means connected to one of the weighted data input line means of one of said one or more Output Layer Processing Elements for transmitting a weighted data output value to the Output Layer Processing Element as one of its weighted data input values;
(c) a error input line means connected to the error output line means of one of said one or more Output Layer Processing Elements for receiving the error output value from that Output Layer Processing Element as an error input value;
(d) a weighted error output line means connected to one of the weighted error input line means of one of said one or more Hidden Layer Processing Element(s) for transmitting a weighted error output value to that Hidden Layer Processing Element as one of its weighted error input values; and
(e) a weighting means including a weight value for transferring the data input value in proportion to the weight value as the weighted data output value to the weighted data output line means and for transferring the error input value in proportion to the weight value as the weighted data output value to the weighted error output line means; and (10) each Tensor Weight Element comprising:
(a) a data input line means connected to a data output line means of one of said one or more Input Layer Processing Elements for receiving the data output value from that Input Layer Processing Element as a data input value;
(b) a weighted data output line means connected to one of the weighted data input line means of one of said one or more Hidden Layer Processing Elements for transmitting a weighted data output value to that Hidden Layer Processing Element as one of its weighted data input values;
(c) an error input line means connected to the error output line means of one of said one or more Hidden Layer Processing Elements for receiving the error output value from that Hidden Layer Processing Element as an error input value;
(d) a net data feedback input line means connected to the net data feedback output line means of one of said one or more Hidden Layer Processing Elements for receiving the net data feedback output value from that Hidden Layer Processing Element as a net data feedback input value;
(e) an update signal line means for receiving the update signal;
(f) selective weighting means comprising:
(i) selection means for producing a selected weight value, said selected weight value being either a low weight value or a high weight value dependent on said selector value; and
(ii) combining means for producing the weighted data output value from the data input value and the selected weight value; and
(g) selection change means for receiving the low weight value, the high weight value, the selector value, the error input value, the net data feedback input value, and the update signal and for determining therefrom if switching the selector value and thereby causing the non-selected weight value to become the selected weight value would decrease the total error, and if it would, for producing a switch signal.

2. A Tensor Weight Element for use in a neural network; the neural network for receiving: an input vector comprised of one or more input vector element values; an error vector comprised of one or more error vector element values, each element value dependent on a corresponding output vector element value; and an update signal; the neural network for producing: an output vector comprised of one or more output vector element values; there being an associated total error value dependent on the magnitude of the error vector; the neural network comprising: an input processing element means for receiving an input vector element value, and for producing a data input value dependent on the input vector element value; an output processing element means for receiving a weighted output data value and an error vector element value, and for producing an output vector element value dependent on the weighted output data value, a net data feedback value dependent on the weighted output data value, and an error feedback value dependent on the error vector element value; said Tensor Weight Element for connection between the input processing element means and the output processing element means; for receiving the input data value from the input processing element means, and the net data feedback value and the error feedback value from the output processing element means and for transmitting the weighted output data value to the output processing element means; said Tensor Weight Element comprising:

(1) data input means for receiving the data input value from the input processing element means;
(2) weighted data output means for transmitting the weighted data output value to the output processing element;
(3) selective weighting means comprising:
(a) selector value means for storing and modifying a selector value;
(b) selector means for producing a selected weight value; said selected weight value being either a low weight value or a high weight value dependent on the selector value; and
(c) combining means for combining the selected weight value with the data input value and, in response thereto, for producing the weighted data output value; and
(4) selective change means for determining from the net data feedback value, the error feedback value, the data input value, the low weight value, the high weight value and the selector value if switching the selector value, and thereby making the non-selected weight value the selected weight value will decrease the total error value of the neural network.

3. A tensor weight element for use in a neural network; said tensor weight element comprising:
(1) data input value line for receiving a data input value;
(2) weighted data output line;
(3) selective weighting means comprising:
   (a) selector value means for storing a selector value;
   (b) selection means for producing a selected weight value; said selected weight value being either a low weight value or a high weight value, dependent on the selector value;
   (c) combining means for combining the selected weight value from said selection means with the data input value from said data input line to produce a weighted data output value on said weighted data output line; and
   (d) selective change means for determining if changing the selector value, and thereby changing the selected weight, will decrease the error of the neural network.

4. A Tensor Weight Element for use in a neural network of the type having: an input layer for receiving an input vector of one or more input vector elements, the input layer having one or more input processing elements, each for receiving an element of the input vector and in response thereto for producing a data value; an output layer for producing an output vector of one or more output vector elements and for receiving an error vector of one or more error vector elements, the error vector being a function of the difference between the output vector and a target vector, the output layer having one or more output processing elements, each for receiving one or more weighted data values and in response thereto for producing an element of the output vector and a net data feedback value, and each for receiving a element of the error vector and in response thereto for producing an error output value; said Tensor Weight Element for connecting an input processing element with an output processing element and comprising:
(1) data input value line for receiving the data value from an input processing element as an input data value;
(2) average error line means for receiving the error values from one or more output processing elements and for producing an average error value;
(3) net data feedback line means for receiving the net data feedback value from an output processing element;
(4) weighted data output line for outputing a weighted data value;
(5) selective weighting means comprising:
   (a) selector value means for storing a selector value;
   (b) selection means for producing a selected weight value; said selected weight value being either a low weight value or a high weight value, dependent on the selector value;
   (c) combining means for combining the selected weight value from said selection means with the data input value from said data input line to produce a weighted data output value on said weighted data output line; and
(6) selective change means for receiving: the net data feedback value from said net data feedback line; the average error value from said average error line means; the data input value from said data input line; and the low weight value, the high weight value, and the selector value from said selective weighting means; and for determining therefrom if changing the selector value, and thereby changing the selected weight, will decrease the error of the neural network.

* * * * *